(12) United States Patent
Wall, Jr. et al.

(10) Patent No.: US 11,624,880 B2
(45) Date of Patent: Apr. 11, 2023

(54) COMMUNICATION MODULE ENGAGEMENT

(71) Applicant: Infinera Corporation, Sunnyvale, CA (US)

(72) Inventors: Franklin Wall, Jr., Vacaville, CA (US); Paul Gavrilovic, Allen, TX (US); Walter Shakespeare, Allentown, PA (US)

(73) Assignee: Infinera Corporation, San Jose, CA (US)

( * ) Notice: Subject to any disclaimer, the term of this patent is extended or adjusted under 35 U.S.C. 154(b) by 215 days.

(21) Appl. No.: 16/945,190

(22) Filed: Jul. 31, 2020

(65) Prior Publication Data

US 2021/0103108 A1 Apr. 8, 2021

Related U.S. Application Data

(60) Provisional application No. 62/912,164, filed on Oct. 8, 2019.

(51) Int. Cl.
*H04B 10/00* (2013.01)
*G02B 6/42* (2006.01)
*H04B 10/40* (2013.01)

(52) U.S. Cl.
CPC ......... *G02B 6/4261* (2013.01); *G02B 6/4246* (2013.01); *G02B 6/4269* (2013.01); *H04B 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,721,177 B1* | 4/2004 | Wang | ................... | G11B 33/128 |
| 7,036,574 B2* | 5/2006 | Thompson | ........... | F28D 15/0233 165/185 |
| 7,090,519 B2* | 8/2006 | Muramatsu | ........ | H01R 13/6335 439/159 |
| 7,133,285 B2* | 11/2006 | Nishimura | ........... | H05K 5/0265 165/185 |
| 7,448,921 B2* | 11/2008 | Kim | ...................... | H05K 5/0286 439/744 |
| 7,542,294 B2* | 6/2009 | Caines | ............... | H05K 7/20854 361/714 |
| 7,545,638 B2* | 6/2009 | Aoto | .................... | H05K 5/0295 439/485 |
| 7,667,972 B2* | 2/2010 | Chen | .................... | H05K 7/2049 165/185 |
| 7,733,652 B2* | 6/2010 | Costello | ............... | H05K 5/0286 361/704 |

(Continued)

*Primary Examiner* — Agustin Bello
(74) *Attorney, Agent, or Firm* — David L. Soltz

(57) ABSTRACT

An optical transceiver having a locking assembly that prevents undesirable movement of the optical transceiver when engaged with another device is described. The locking assembly includes a slide with a projection, lift, and weighted stops. In a first configuration, the slide and weighted stops can sustain contact between a thermal interface material of the optical transceiver and the other device while locking the optical transceiver to prevent movement. In a second configuration mode, the locking assembly disengages the thermal interface material from the other device and unlocks the weighted stops to permit disconnection from the other device.

21 Claims, 8 Drawing Sheets

(56) References Cited

U.S. PATENT DOCUMENTS

| | | | | |
|---|---|---|---|---|
| 7,852,633 | B2 * | 12/2010 | Ito | H05K 5/0286 439/485 |
| 7,974,098 | B2 * | 7/2011 | Oki | G02B 6/4201 165/185 |
| 8,081,470 | B2 * | 12/2011 | Oki | G02B 6/4201 165/185 |
| 8,911,244 | B2 * | 12/2014 | Elison | H05K 7/20409 439/137 |
| 9,313,925 | B2 * | 4/2016 | Kelty | G06F 1/183 |
| 9,671,580 | B1 * | 6/2017 | Nagarajan | H04B 1/3833 |
| 9,893,474 | B1 * | 2/2018 | Jandt | H01R 13/6592 |
| 10,073,230 | B2 * | 9/2018 | Wilcox | H04B 10/40 |
| 10,222,844 | B1 * | 3/2019 | Reddy | G06F 1/183 |
| 10,310,198 | B1 * | 6/2019 | Yatskov | G02B 6/4261 |
| 10,394,288 | B2 * | 8/2019 | Leigh | G06F 1/183 |
| 10,437,298 | B2 * | 10/2019 | Chang | H05K 7/20509 |
| 10,534,138 | B2 * | 1/2020 | Leigh | G02B 6/4284 |
| 10,874,032 | B2 * | 12/2020 | Leigh | H05K 7/20636 |
| 10,925,186 | B2 * | 2/2021 | Selvidge | H05K 7/20509 |
| 10,965,333 | B2 * | 3/2021 | English | H01R 13/2457 |
| 11,202,391 | B2 * | 12/2021 | Chien | H05K 7/2049 |
| 11,300,363 | B2 * | 4/2022 | Gupta | F28F 3/02 |
| 2005/0074995 | A1 * | 4/2005 | Kimura | H05K 5/0295 439/159 |
| 2009/0296351 | A1 * | 12/2009 | Oki | G02B 6/4246 361/709 |
| 2010/0067196 | A1 * | 3/2010 | Costello | H05K 7/20509 361/709 |
| 2013/0077254 | A1 * | 3/2013 | Nguyen | G02B 6/4246 29/428 |
| 2019/0013617 | A1 * | 1/2019 | Ayzenberg | H01R 13/6582 |
| 2021/0103108 | A1 * | 4/2021 | Wall, Jr. | G02B 6/4246 |

* cited by examiner

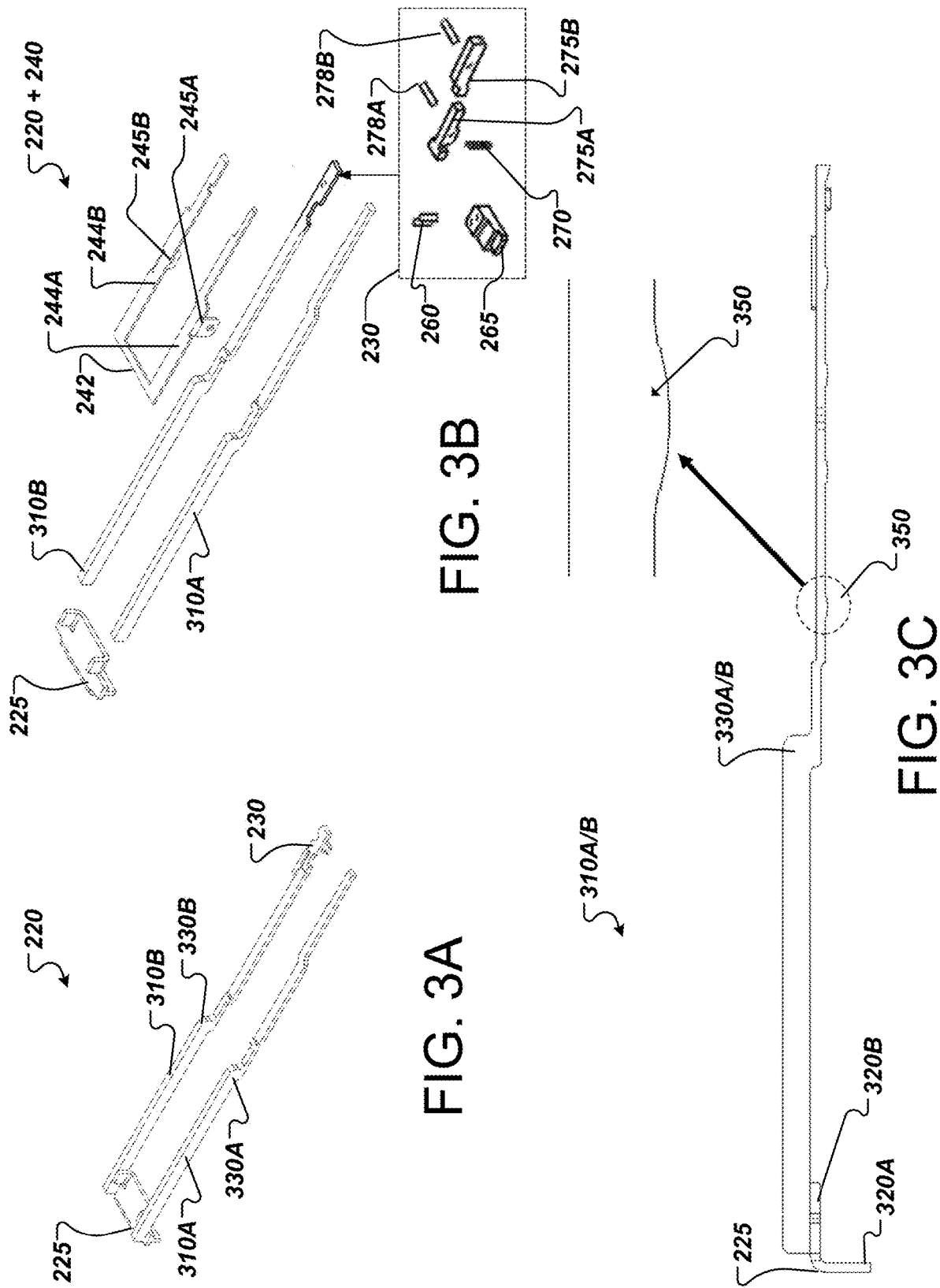

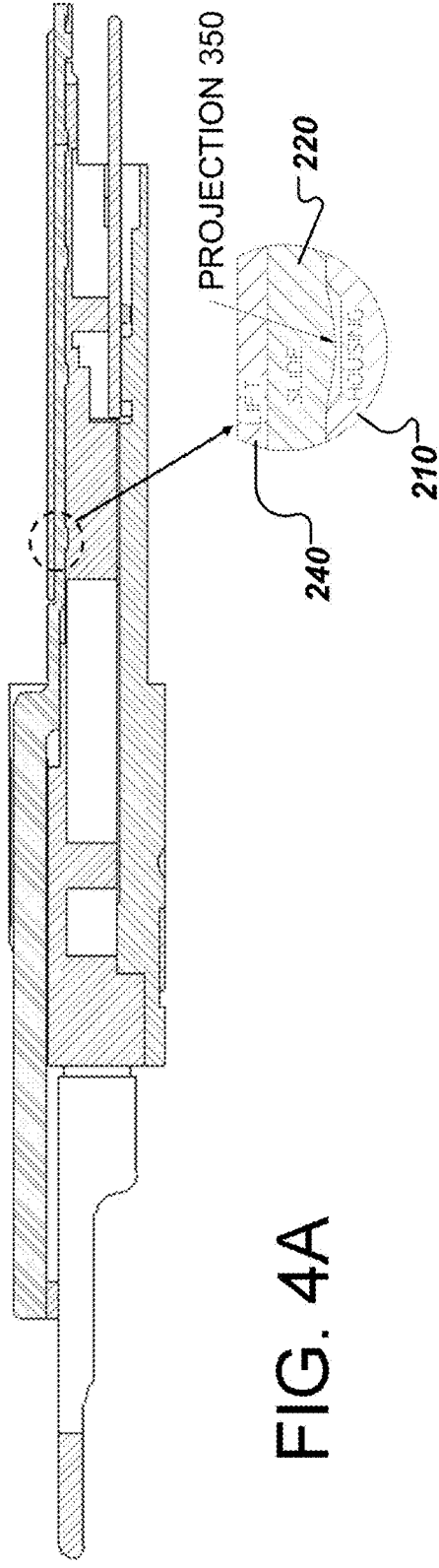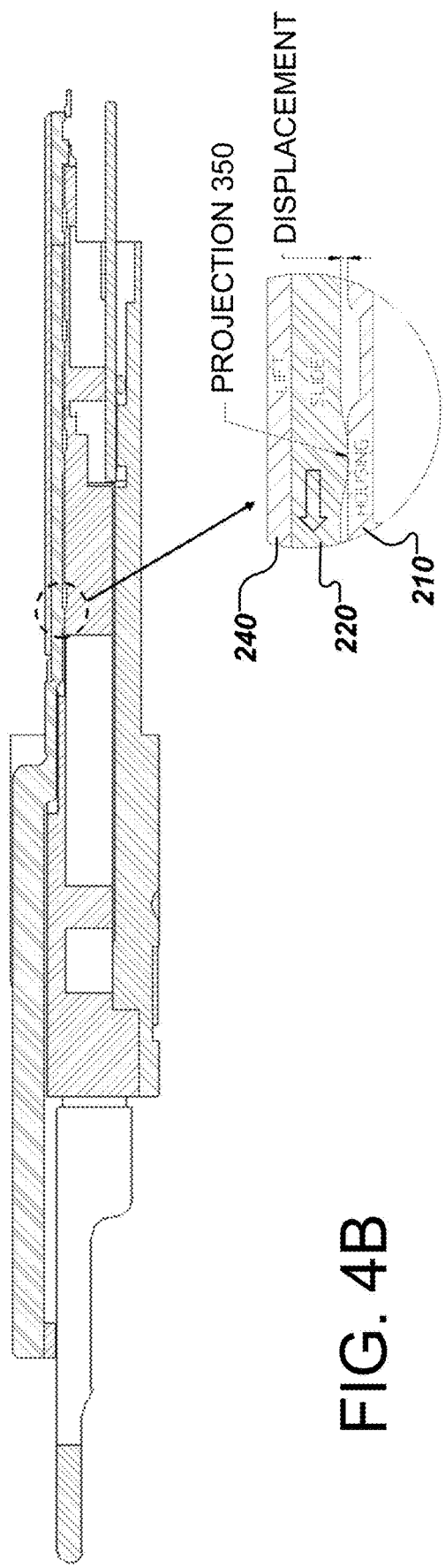
FIG. 4A
FIG. 4B

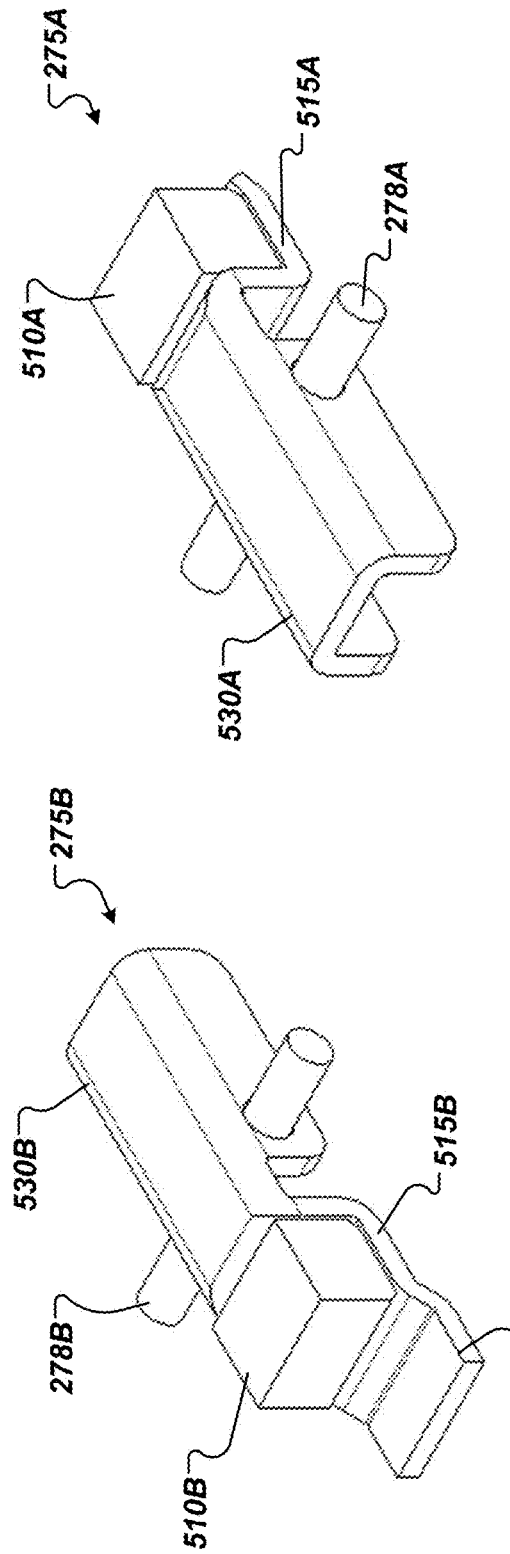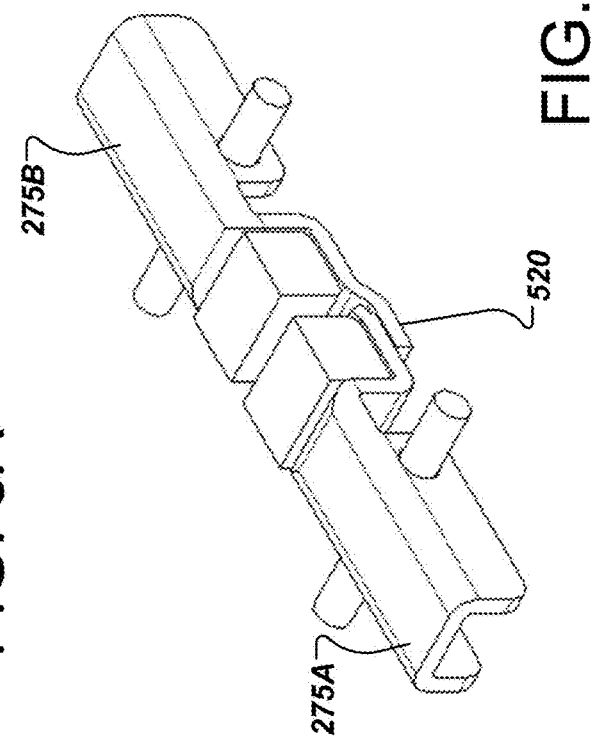
FIG. 5A
FIG. 5B
FIG. 5C

Footer Assembly Orientation with disengaged lock footer

Footer Assembly Orientation with engaged lock footer

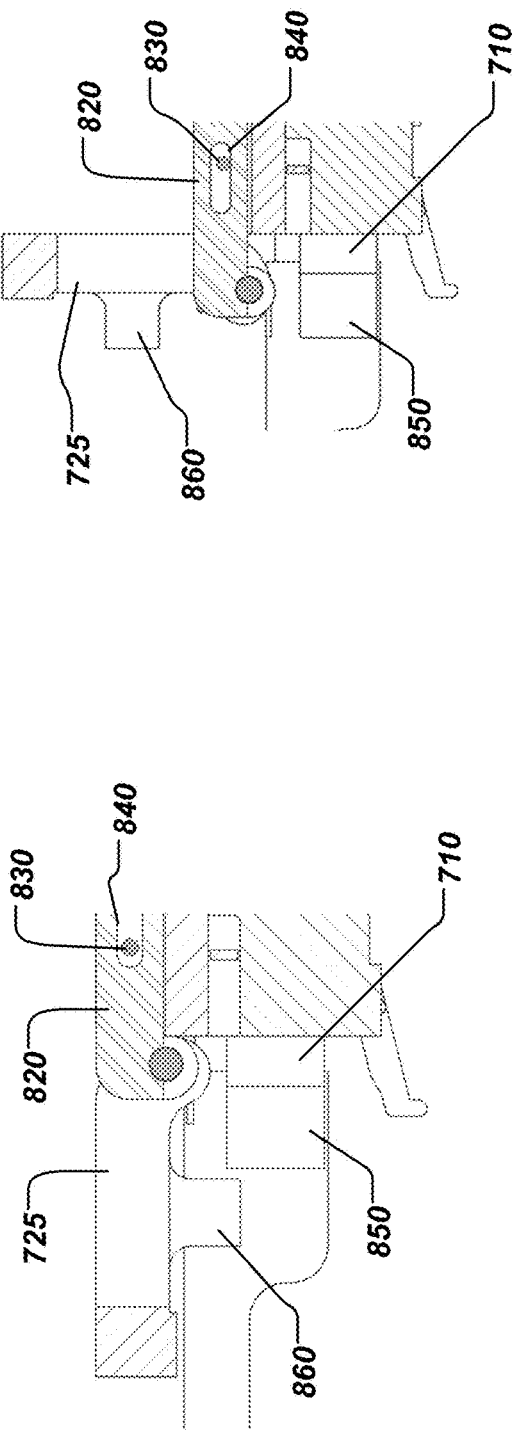
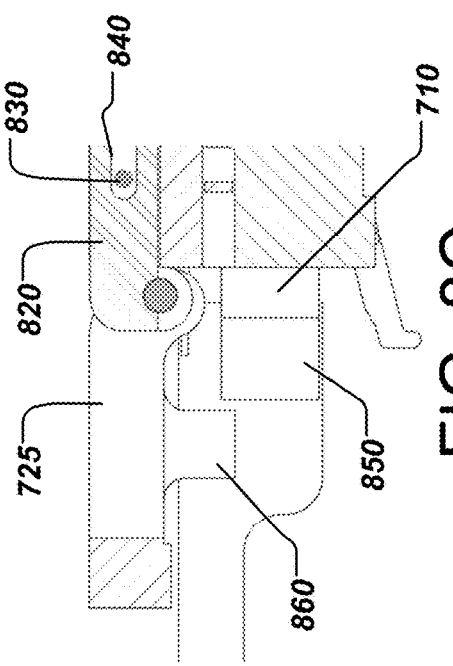
FIG. 8A
FIG. 8B
FIG. 8C

ODE ENGAGEMENT

CROSS-REFERENCE TO RELATED APPLICATION

This application claims the benefit of U.S. Provisional Application No. 62/912,164, filed Oct. 8, 2019, which is incorporated herein by reference in its entirety.

FIELD

This specification generally relates to optical transceivers.

BACKGROUND

Optical transceiver devices can be plugged into a port of an electronic device to connect the electronic device to data transportation structures such as copper or fiber cables. However, components within an optical transceiver device may be damaged when connecting the optical transceiver device to other devices.

SUMMARY

This disclosure describes systems, methods, devices, and other implementations for securing an optical transceiver device and protecting components therein from being damaged when the optical transceiver device is being connected to other devices.

According to some implementations, a device includes a shell, a slide, and a lift. The shell is configured to provide a cover for the device and includes a projection receptacle. The slide is configured to slide along a surface of the shell. The slide includes a projection that is configured (i) to be located in the projection receptacle in a first mode in which a thermal interfacing structure is contacting a heat-transferring device, and (ii) to be located outside the projection receptacle in a second mode in which the thermal interfacing structure is not contacting the heat-transferring device. The lift is disposed on the slide and is configured to be separated by a distance from the heat-transferring device in the first mode and to be elevated to contact the heat-transferring device in the second mode.

In some implementations, a pluggable optical transceiver device includes a slide, a thermal interfacing structure, and a lift. The slide is configured to move between a first position in which a heat-transferring device is engaged with a thermal interfacing structure and a second position in which the heat-transferring device is not engaged with the thermal interfacing structure. The thermal interfacing structure is disposed between a heat-transferring device and the slide. The lift is disposed on the slide and configured to be separated from the heat-transferring device by the thermal interfacing structure when the slide is in the first position. The lift is configured to directly contact the heat-transferring device when the slide is in the second position.

In some implementations, a quad small form factor pluggable double density device includes a shell, a slide, a thermal interfacing structure, a lift, and a cam lever. The shell is configured to cover the quad small form factor pluggable double density device and includes a projection receptacle. The slide includes a projection and is configured to move along a surface of the shell between a first position and a second position. In the first position, the projection is configured to be located in the projection receptacle such that a thermal interfacing structure directly contacts a heat-transferring device. In the second position, the projection is not located in the projection receptacle and the thermal interfacing structure is not contacting the heat-transferring device. The thermal interfacing structure is disposed between a heat-transferring device and the slide. The lift is disposed on the slide and is configured to be separated from the heat-transferring device by the thermal interfacing structure when the thermal interfacing structure is directly contacting the heat-transferring device. The lift directly contacts the heat-transferring device when the thermal interfacing structure is not directly contacting the heat-transferring device. The cam lever is attached to one end of the slide and is configured to move the slide between the first position and the second position of the slide such that a height of the lift increases by about 100 to 150 microns relative to the surface of the slide.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A, 3B, and 3C depict examples of a slide, lift, and footer assembly used in an optical transceiver device.

FIGS. 4A and 4B depict example views of a movement of a projection along a shell of the optical transceiver device.

FIGS. 5A, 5B, and 5C depict example views of weighted stops.

FIGS. 8A, 8B, and 8C depict examples of lever movement to engage and disengage the optical transceiver device.

Like reference numbers and designations in the various drawings indicate like elements.

DETAILED DESCRIPTION

Optical transceiver devices can be used as an interface between electronic devices like network servers or switches and data transportation structures such as copper or fiber cables. To prevent the optical transceiver device from being damaged during or in the process of being connected to other devices, the optical transceiver device may include a locking assembly comprising a variety of features such as a compound slide with a projection, weight stops, and a lift.

In a first operation mode of the optical transceiver device when a thermal interface material (TIM) of the optical transceiver device is engaged with another device such as a heat sink, the slide's projection may be located within a receptical of the optical transceiver device's shell. Weighted stops may be tilted to lock the optical transceiver device in place and prevent its movement.

In a second operation mode, a user may desire to disengage the optical transceiver device from the other device and may move the projection out of the receptacle. Moving the projection out of the receptacle results in the slide and lift rising by abut 100 to 150 microns. As a result of this vertical displacement, lift engages with the other device and causes the thermal interface material to disengage from the other device. At the same time, the weighted stops are reoriented to be in a linear orientation and not titled. The linear orientation allows the user to disengage the optical transceiver device from the other device if desired.

Additional details and benefits of the locking assembly used in an optical transceiver device are described below with reference to the figures.

Figure 1:
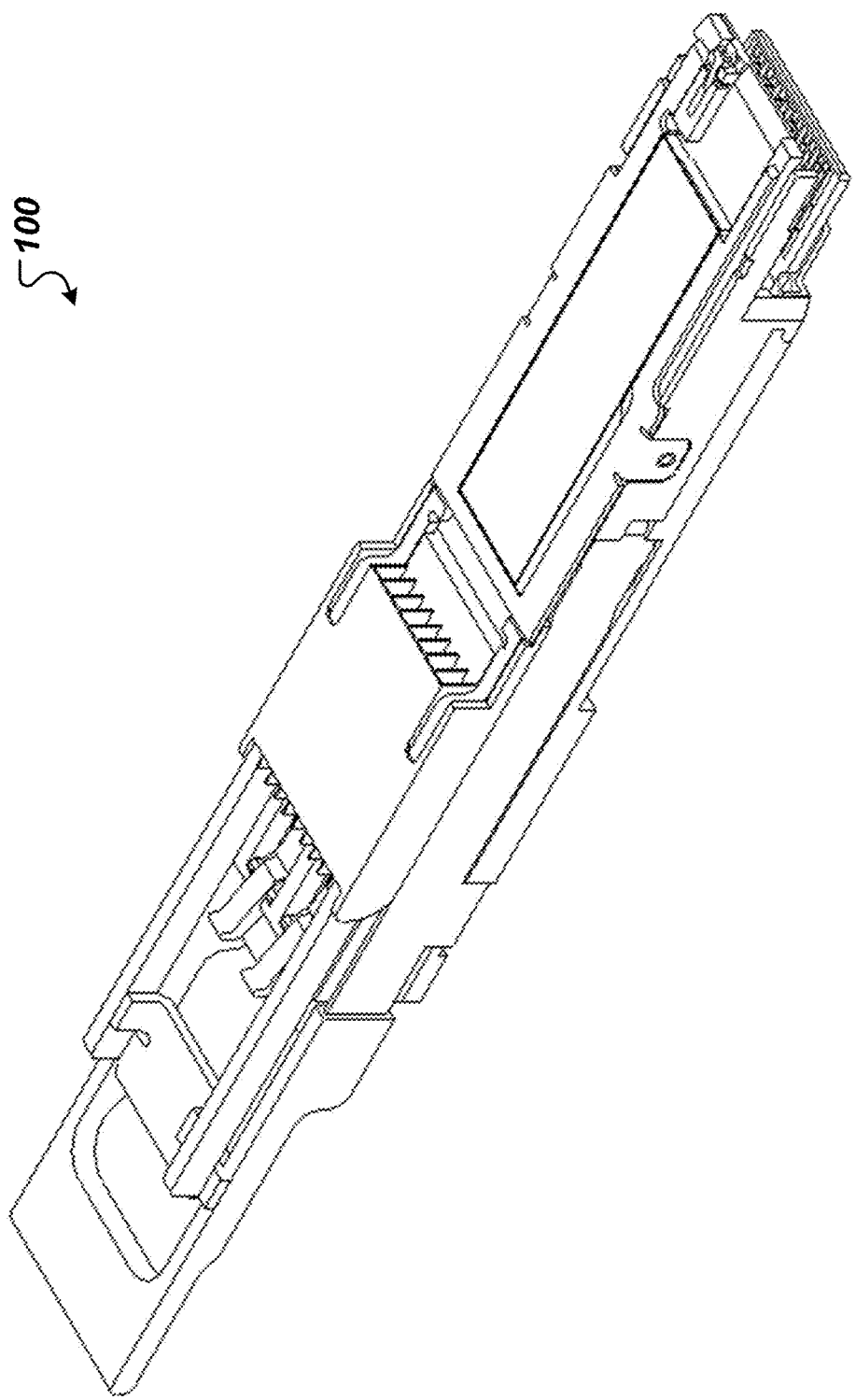
FIG. 1 depicts an example of an optical transceiver device.

FIG. 1 illustrates an example of an optical transceiver device 100 with a locking assembly. The optical transceiver device 100 includes built in components such as a transmitter and a receiver (TROSA). The transmitter in the optical transceiver device 100 may generate an electrical signal at a certain code rate to drive a semiconductor laser (LD) or an optical emitting diode (LED) to emit a modulated optical signal of a corresponding rate through a medium such as a fiber optic cable. The receiver in the optical transceiver device 100 is operable to receive an optical signal input at a certain code rate, and to convert the optical signal to an electrical signal using. For example, a photodetecting diode for further processing.

In general, the optical transceiver device 100 may be configured to transport data between a data-transferring component such as, e.g., a copper or fiber optic cable, and an electronic device such as, e.g., a server or network switch. One end of the optical transceiver device 100 can be plugged into a port of the electronic device, and another end connected to the data-transferring component. Because the optical transceiver device 100 operates, in part, as an interface between a data-transferring component and an electronic device, an optical transceiver also may be referred to as a network interface device.

In general, an optical transceiver device 100 can be implemented in various shapes, sizes, and configurations. In some implementations, the optical transceiver device 100 may be a small form-factor pluggable (SFP) device, which is a compact, hot-pluggable network interface module used for both telecommunication and data communications applications. An SFP interface on networking hardware is a modular (plug-and-play) slot for a media-specific transceiver in order to connect a fiber-optic cable or sometimes a copper cable.

Examples of SFP devices include, but are not limited to, a Quad Small Form-factor Pluggable (QSFP) device and a QSFP-DD (QSFP-Double Density). QSFPs include additional lanes relative to other SFPs to support four times faster speeds (e.g., up to 200 Gbit/s) than corresponding SFPs. QSFP-DDs are similar to QSFP but include an additional row of contacts providing for an eight lane electrical interface. QSFP-DD devices can offer double (e.g., up to 400 Gbit/s) the speed of QSFPs. With such high data transfer speeds and dense circuitry supporting the data transfer within the optical transceiver, effective thermal management is desired to prevent overheating, as explained above. This disclosure describes optical transceivers having a locking assembly that prevents undesirable movement resulting in engagement or disengagement of the optical transceivers with other electronic devices such as, e.g., heat sinks.

Figure 2:
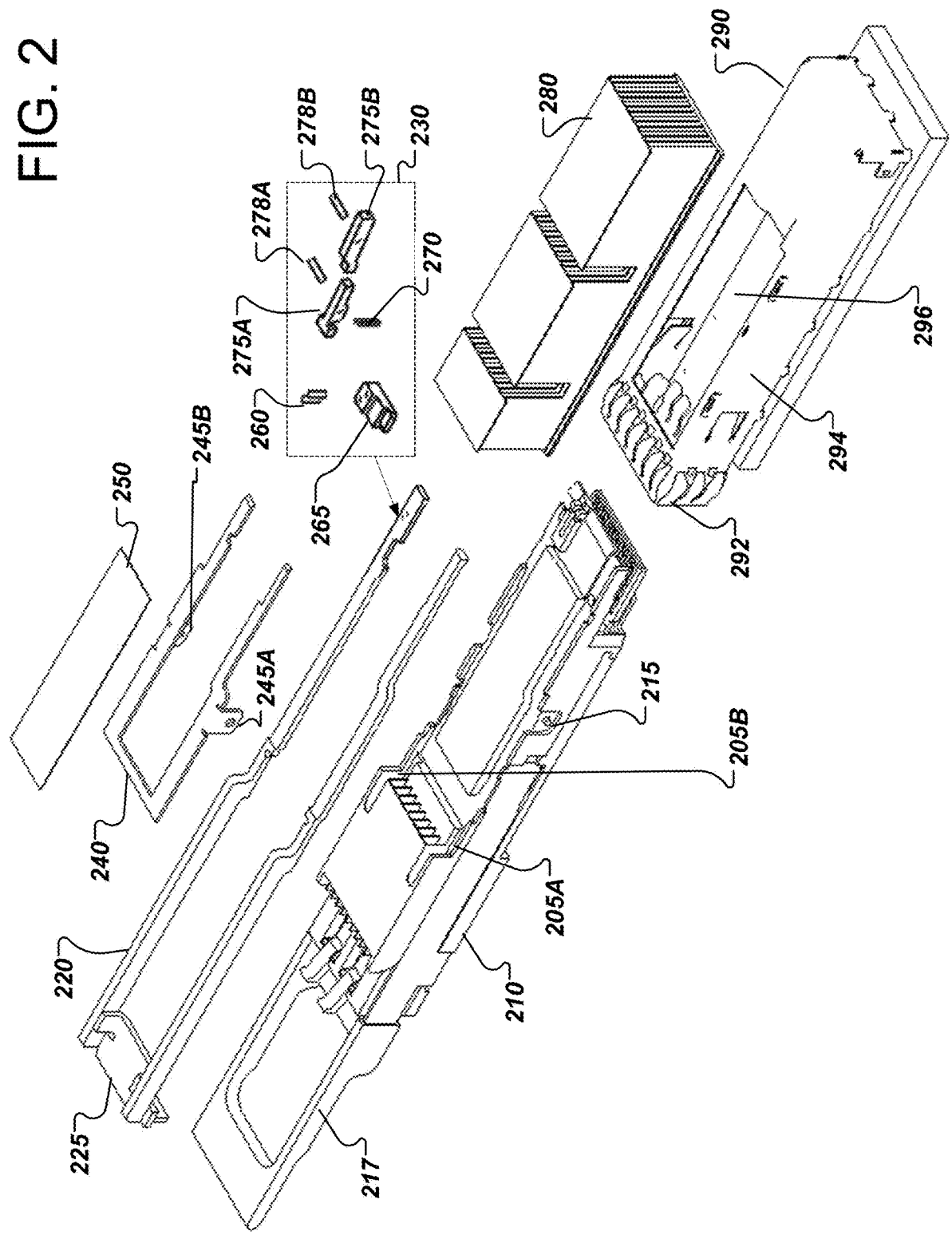
FIG. 2 depicts an exploded view of an example optical transceiver system including an optical transceiver device, a heat-transferring device, and a cage.

FIG. 2 depicts an exploded view of an example optical transceiver device 100 configured for coupling to a heat-transferring device 280 such as a heat sink. In more detail, the optical transceiver device 100 includes a shell 210, a slide 220, a footer assembly 230, a lift 240, and a thermal interface material (TIM) 250. The optical transceiver device 100 is configured to be connected with other electronic devices such as heat-transferring device 280 and cage assembly 290.

Shell 210 or housing 210 provides the external structure or skeleton for the optical transceiver device 100 and operates as a cover to protect components, e.g., circuits, chips, wires, within the optical transceiver device 100 from external forces and elements. Shell 210 may extend from one end of the optical transceiver device 100 configured to be connected to data transportation structures, e.g., copper or fiber cables, to a second end configured to be plugged into the heat-transferring device 280 and cage assembly 290. In general, the shell may be made of any suitable material such as, e.g., zinc, aluminum, or a combination thereof, that can withstand environmental and thermal fluctuations and provide structural support to internal components of the optical transceiver device 100.

Shell 210 may be coupled to a device handle 217. The device handle 217 can be held by a user to hold or move the optical transceiver device 100. Shell 210 may include fin slots 205A, 205B on two side edges of the optical transceiver device 100. The fin slots 205A, 205B are configured to receive and engage with slide 220 when inserted onto the shell 210. In some implementations, the shell 210 may include a projection receptacle (discussed in further detail with respect to FIG. 3C below). The projection receptacle is configured to receive a projection of the slide 220 when the TIM 250 is engaged with the heat-transferring device 280. The projection receptacle can be implemented in several shapes and forms suitable to accommodate the shape and form of the projection of the slide 220. For example, in some implementations, the projection receptacle may have a curved surface to accommodate a lobe-shaped projection of the slide 220. In other cases, the projection of the slide 220 may have, at least in part, a linear surface to accommodate a linear surface of the projection of the slide 220.

In some implementations, posts 215 may be disposed or formed on one or more sides of the shell 210. The posts 215 are configured to engage with tabs 245A, 245B of the lift 240 to secure a direct coupling of the lift 240 to the shell 210. Although only one post 215 is shown in FIG. 2, multiple posts 215 may be implemented along two lateral sides of the shell 210 so that the lift 240 can be secured to the shell 210.

As shown in FIGS. 2 and 3A-3C, slide 220 includes a handle 225, a pair of slide rails 310A, 310B, a footer assembly 230, and transitional portions 330A, 330B. Handle 225 may be implemented on one end of the slide 220, and a footer assembly 230 may be implemented on the end of the slide 220 that is opposite to the end at which the handle 225 is attached. The handle 225 may be implemented on the end of the slide 220 that is accessible to a user such that the user may push or pull the slide 220. The handle 225 may be implemented along or in proximity to the end of the optical transceiver device 100 that is coupled to the data transportation structures such as e.g., copper or fiber cables.

The handle 225 may include a vertical component 320A connected to a horizontal component 320B. The horizontal component 320B can be affixed to slide rails 310A, 310B using various suitable fastening methods such as, e.g., soldering, welding, or applying an adhesive. The vertical component 320A may be connected to the horizontal component 320 B through a curved surface. A user may place the user's fingers, palm, or hand on the vertical component 320A to pull or push the slide 220. As described in more detail below, the user may push or pull the slide 220 to engage or disengage the lift 240 and TIM 250 with the heat-transferring device 280.

Slide rail 310A may be spaced apart and parallel to slide rail 310B. Slide rail 310A may be spaced part from slide rail 310B by a distance equivalent to a width of handle 225, which may be directly or indirectly connected to the pair of slide rails 310A, 310B. Slide rails 310A, 310B may extend lengthwise from one end of the optical transceiver device 100 configured to be connected to data transportation structures such as e.g., copper or fiber cables to a second end configured to be plugged into the heat-transferring device 280 and cage assembly 290.

Slide rail 310A is disposed along one side edge of the shell 210, and slide rail 310B is disposed along an edge of the shell 210 that is on the opposite side of shell 210 from the one side edge. Slide rail 310A may slot into fin slot 205A, and slide rail 310B may slot into fin slot 205B. The slide rails 310A, 310B may also include one or more transition regions 330A, 330B, respectively, that adjust the height of the slide rails 310A, 310B to conform or be parallel to the surface of the shell 210 or components thereof so that the slide rails 310A, 310B may be disposed smoothly above the shell 210.

For example, the slide rail 310A shown in the figures includes an upper slide rail portion connected to the handle 225. A lower slide rail portion of the slide rail 310A is connected to the upper slide rail portion of the slide rail 310A by the transition regions 330A and extends towards the end that connects with the heat-transferring device 280 and cage 290. Similarly, the slide rail 310B shown in the figures includes an upper slide rail portion connected to a lower slide rail portion by the transition region 330B. A lower slide rail portion of the slide rail 310B extends towards the end that connects with the heat-transferring device 280 and cage 290, and is attached to the footer assembly 230. The footer assembly 230 is described in more detail with respect to FIGS. 5A-6D.

Referring to FIG. 3C, one or both of the slide rails 310A, 310B may include a projection 350. Projection 350 may be formed on one or both of the slide rails 310A, 310B. Projection 350 may be implemented as a lobe and may bulge from a surface of the slide rails 310A/310B. In general, the projection 350 may have various suitable shapes including a curved surface such as an elliptical surface or a linear surface such as a trapezoidal or rectangular-shaped surface. The projection 350 may be in direct contact with the shell 210 and may travel along the surface of the shell 210 when the user pushes or pulls the handle 225.

Referring back to FIGS. 2 and 3B, a lift 240 may be disposed on the slide 220. In some implementations, the lift 240 may be disposed directly above the lower slide rail portions of slide 220. Because the lift 240 is disposed above slide 220, a vertical displacement of the slide 220 also results in a corresponding vertical displacement by the lift 240. In some cases, the top surface of the lift 240 may be displayed or elevated by about 100 to 150 microns.

The lift 240 includes a horizontal component 242 and two arms 244A, 244B. The horizontal component 242 stretches across the body of slide 220 and the optical transceiver device 100, and may be parallel to the horizontal component 320B of handle 225. The arms 244A, 244B are parallel to each other and may be disposed on top of the two side rails 310A, 310B. The two arms 244A, 244B extend away from the transitional portions 330A, 330B towards the heat-transferring device 280 and cage 290. The horizontal component 242 connects an end of arm 244A to an end of arm 244B.

The arms 244A, 244B include tabs 245A, 245B, respectively. A tab 245A/245B may descend vertically from a side edge of the lift 240 and beyond the slide 220. Each tab 245A/245B may include a hole or cavity. The hole or cavity of tabs 245A, 245B may be configured to surround the posts 215 of shell such that the lift 240 is secured to the shell 210 when the lift 240 is lifted. For example, if the posts 215 and the hole or cavity in tabs 245A, 245B are circular in shape, a radius and circumference of the hole or cavity in tabs 245A, 245B may be slightly larger than the radius and circumference of a post 215 to allow the tabs 245A, 245B to snugly engage with the posts 215 and affix the lift 240 to the slide 220.

A TIM 250 may be disposed on the shell 210 between the two arms 244A, 244B of the lift 240. The TIM 250 may transfer heat away from one or more regions of the optical transceiver device 100 to another region of the optical transceiver device 100, or, more generally, to or from any device the TIM is thermally connected to. In some cases, one or more portions of the TIM 250 may contact one or more of the heat-transferring device 280, shell 210, cage 290, and one or more integrated circuit regions of the optical transceiver device 100. In some implementations, the TIM 250 only may contact the heat-transferring device 280 when the slide 220 is in a particular position such that projection 350 is located within projection receptacle. When in contact with the heat-transferring device 280, TIM 250 may transfer heat from one of the integrated circuit regions of the optical transceiver device 100 to the heat-transferring device 280 thereby facilitating heat management of the optical transceiver device 100.

Cage 290 is configured to receive a pluggable end of the optical receiver 100. Cage 290 may include a housing or shell 294, a pluggable end 292, and an opening 296. Shell 294 provides the external structure or skeleton to provide structural support and protection to components within the shell 294. The components within the shell 294 provide an interface between the optical transceiver device 100 and the heat-transferring device 280. In some implementations, the design, including thermal and mechanical specifications, of the shell 294 may comply with the specifications of the MSA.

The pluggable end 292 of the cage 290 is configured to be engaged with the optical transceiver device 100. In particular, the pluggable end 292 of the cage 290 may have a first opening to allow a pluggable end of the optical transceiver device 100 to be inserted into the cage 290.

The pluggable end of the optical transceiver device 100 may include the end at which the footer assembly 230 is located and, more generally, includes one or more ends of the optical transceiver device 100 that are opposite to the end connected to the data transportation structures such as e.g., copper or fiber cables. The pluggable end 292 of the cage 290, and more generally the cage 290, may include one or more locking mechanisms such as, e.g., fasteners, that provide resistance to the decoupling of the cage 290 and the optical transceiver device 100 once the cage 290 and the optical transceiver device 100 are coupled together.

Cage 290 may also include a second opening 296 that exposes a cavity within the cage 290. The cavity accommodates the optical transceiver device 100 when inserted into and engaged with the cage 290. When the optical transceiver device 100 is inserted into the cage 290, the second opening 296 may expose a top surface of the optical transceiver device 100.

Heat-transferring device 280 may be engaged with the cage 290 and the optical transceiver device 100. In general, the heat-transferring device 280 may refer to a passive electronic component configured to transfer heat generated by an electronic or a mechanical device to another medium, e.g., air, liquid. In some implementations, the heat-transferring device 280 may be a heat sink.

The heat-transferring device 280 may be mechanically and electrically connected to the cage 290 and/or the optical transceiver device 100 in various configurations. In some implementations, a spring-loaded heat-transferring device 280 is disposed on top of the cage 290 and the optical transceiver device 100. The cage 290 provides structural support so that the heat-transferring device 280 can engage with the optical transceiver device 100.

Furthermore, as noted above, the second opening 296 in cage 290 exposes portions of the optical transceiver device 100 when inserted into the cage 290. When the heat-transferring device 280 is disposed on the cage 290, the heat-transferring device 280 may be coupled, directly or indirectly, to the TIM 250 or lift 240 of the optical transceiver device 100. Through coupling with the TIM 250, heat may be transferred away from the optical transceiver device 100 and towards the heat-transferring device 280. The heat-transferring device 280 is configured to transfer heat from the optical transceiver device 100 to the ambient environment, e.g., air, thereby allowing the temperatures of the optical transceiver 100 to be managed (e.g., cooled). This heat-transferring device 280 may include one or more fans to direct and control airflow in a particular direction, e.g., from the end of the optical transceiver device 100 connected to the data transport structures to an end of the heat-transferring device 280 facing away from the optical transceiver device 100.

In some implementations, additional cooling capacity and elements may be included in the heat-transferring device 280 to provide additional heat relief to the optical transceiver device 100. In some implementations, the cage 290 and heat-transferring device 280 are assembled into a rack box.

Referring to FIGS. 4A, 4B, and 3C, recall that the slide rails 310A, 310B of the slide 220 may include a projection 350. Projection 350 may be located in a projection receptacle of the shell or housing 210 in a first position of the slide 220 corresponding to when the heat-transferring device 280 is engaged with the TIM 250. The projection 350 may be located outside of the projection receptacle of the shell or housing 210 in a second position of the slide 220 corresponding to when the heat-transferring device 280 is engaged with the lift 240 and disengaged with the TIM 250. In some implementations, the first position may be laterally displaced from the second position by about 2 mm. In some implementations, the slide 220 is 2 mm closer to the heat-transferring device 280 when the heat-transferring device 280 is engaged with TIM 250 (first position) than when the heat-transferring device 280 is not engaged with the TIM 250 (second position). In some implementations, the second position may be located on one or two sides of the projection receptacle (first position).

As illustrated in FIGS. 4A and 4B, when the projection 350 moves from within the projection receptacle to outside the projection receptacle, the projection 350 creates a gap or displacement between portions of a bottom surface of the slide 220 and a top surface of the shell or housing 210 due to a depth of the projection 350. The created gap also results in the lift 240 being elevated by a height corresponding to the displacement between the slide 220 and the shell or housing 210. With this displacement, a top surface of the lift 240 may be located higher than a top surface of the TIM 250 relative to shell or housing 210.

In some implementations, multiple projections may be implemented on each of the slide rails 310A/310B. For example, the upper and lower slide rail portions of a slide rail 310A/310B may include the projections. Shell 210 may include multiple projection receptacles to receive the multiple projections implemented on the slide rails 310A/310B.

The use of projections and projection receptacles is important to preserve the TIM 250. For instance, in optical transceiver systems without the locking assembly described in this disclosure, when an optical transceiver device is inserted into a heat-transferring device 280 and cage 290, spring loading of the heat-transferring device 280 may cause a forced wiping action along the top side of the shell 210 which may damage the TIM 250 if present between the heat-transferring device 280 and the shell 210. By using the locking mechanism described in this disclosure, an optical transceiver device 100 may be protected from such damage.

In particular, before engaging with the cage 290, slide 220 of the optical transceiver device 100 can be moved into the second position such that the projection 350 is located outside of the projection receptacle of the shell or housing 210. As explained above, in this position, the lift 240 is elevated above the top surface of the TIM 250 and the heat-transferring device 280 cannot engage with the TIM 250.

The user can then push the slide 220 all the way into the cage 280 if the user would like to engage with the cage 290 and the heat-transferring device 280. At this time, a gap still exists between the TIM 250 and the heat-transferring device 280 due to the elevated position of the lift 240. To engage the TIM 250 with the heat-transferring device 280 so that the TIM 250 can facilitate with heat transfer of the optical transceiver device 100, slide 220 can be pushed back into the first position.

As noted above, in the first position, projection 350 lies within the projection receptacle. The slide 220 and lift 240 drop in elevation, which allows the TIM 250 to engage with the heat-transferring device 280. Furthermore, because projection 350 lies within the projection receptacle, accidental or unintentional disengagement of the optical transceiver device 100 from the heat-transferring device 280 becomes more difficult as the projection 250 provides additional resistance against such movement. For instance, the surface of the projection 350 would incur a greater amount of friction against the surface of the shell or housing 210 when moved. This would require a greater amount of force to be applied onto the slide 220 to move the projection 350 out of the projection receptacle and disengage the optical transceiver device 100.

Another feature to prevent the optical transceiver device 100 from being accidentally or unintentionally disconnected is the footer assembly 230 depicted in FIGS. 2, 3B, and 6A-6D. In FIGS. 2, 3B, 6A, and 6C, the footer assembly 230 is depicted as being attached to one of the two ends of the slide 220 configured to engage with cage 230 and heat-transferring device 280. In some implementations, the footer assembly 230 may be attached to both ends of the slide 220 that are configured to engage with cage 230 and heat-transferring device 280.

The footer assembly 230 may include a lock footer 265, mechanical screws 260, a spring 270, weighted stops 275A, 275B, and pin-pivots 278A, 278B. The lock footer 265 may be attached to slide 220 using mechanical screws 260. As shown in FIGS. 2 and 3, lock footer 265 may include two cavities through which a pair of mechanical screws 260 can be inserted and used to affix the lock footer 265 to slide 220. In some implementations, pins, epoxy adhesive, or welding may be used to affix the lock footer 265 to the slide 220.

FIGS. 5A-5C depict a zoomed in view of the weighted stops 275A and 275B. FIG. 5B depicts weighted stop 275A, which includes a stop body 530A, a weight body 510A, and an extension portion 515A. The stop body 530A includes a cavity to allow pin-pivot 278A to protrude through the stop body 530A. The pin-pivot 278A may support rotational movement of the stop body 530A and function as an anchor of the weighted stop 275A, as described in further detail below.

The stop body 530A may have an extension portion 515A that may protrude from one end of the stop body 530A configured to engage with weighted stop 275B. At the other end of the stop body 530A opposite to the end having an extension portion 515A, the stop body 530A may be attached to a spring 270 (not shown in FIGS. 5A-5C but shown in FIGS. 2, 3, 6B, 6D). The spring 270 provides a compression force that can resist an upward movement of the extension portion 515A.

The extension portion 515A may have a flat surface such that the weighted body 510A may be disposed above the extension portion 515A. The weighted body 510A may be attached to the extension portion 515A using various suitable methods, e.g., welding, soldering, or applying suitable adhesives such as epoxy.

The weighted body 510A may be any suitable dense mass block that can rest within the perimeter of a top surface of the extension portion 515A. In some implementations, the weighted body 510A has a majority of the mass of the weighted stop 275A. The weighted body 510A may provide a downward pressure on the extension portion 515A. In the absence of any support structure beneath the extension portion 515A, gravitational forces may cause the extension portion 515A of the weighted stop 275A to rotate downwards due to the mass of the weighted body 510A. This rotational movement has a rotation access at the pin-pivot 278A, which allows the weighted stop 275A to move clockwise and counter-clockwise.

FIG. 5A depicts weighted stop 275B, which includes a stop body 530B, a weight body 510B, an extension portion 515B, and a lock engagement surface 520. The stop body 530B includes a cavity to allow pin-pivot 278B to protrude through the stop body 530B. The pin-pivot 278B may support rotational movement of the stop body 530B and function as an anchor of the weighted stop 275B, as described in further detail below.

The stop body 530B may have an extension portion 515B that may protrude from one end of the stop body 530B. The extension portion 515B connects the lock engagement surface 520 to the stop body 530B. The extension portion 515B may have a flat surface such that the weighted body 510B may be disposed above the extension portion 515B. The weighted body 510B may be attached to the extension portion 515B using various suitable methods, e.g., welding, soldering, or applying suitable adhesives such as epoxy.

The weighted body 510B may be any suitable dense mass block that can rest within the perimeter of a top surface of the extension portion 515B. In some implementations, the weighted body 510B has a majority of the mass of the weighted stop 275B. In some implementations, The weighted body 510B may have the same mass as weighted body 510A. In some implementations, the weighted body 510B may have a different mass from the weighted body 510A. The weighted body 510B may provide a downward pressure on the extension portion 515B. In the absence of any support structure supporting the lock engagement surface 520, gravitational forces may cause the weighted stop 275B to rotate downwards because of the mass of the weighted body 510B. This rotational movement has a rotation axis at the pin-pivot 278B, which allows the weighted stop 275B to move clockwise and counter-clockwise.

As shown in FIG. 5C, the weighted stop 275A and weighted stop 275B are configured to face each other such that the weighted body 510B faces and is in proximity to the weighted body 510A. The lock engagement surface 520 extends below the extension portion 515A of the weighted stop 275A. For instance, in some cases, a top surface of the lock engagement surface 520 may directly contact a bottom surface of the extension portion 515A. The engagement between weighted stop 275A and weighted stop 275B and the orientation of the lock engagement surface 520 depends on the position of slide 220 and whether the optical transceiver device 100 is engaged with the heat-transferring device 280 as explained in more detail with respect to FIGS. 6A-6D.

FIGS. 6A-6D depict examples of the footer assembly 230 configurations when slide 220 of the optical transceiver device 100 is in first and second positions. As explained above with respect to FIG. 4A, when the slide 220 is in a first position the projection 350 is located within the projection receptacle of shell 210. In the first position, the TIM 250 may be engaged with the heat-transferring device 280. In certain circumstances, such as when the TIM 250 is engaged with the heat-transferring device 280, it is desirable to prevent the optical transceiver device 100 from being accidentally or unintentionally disconnected.

Figure 6A:
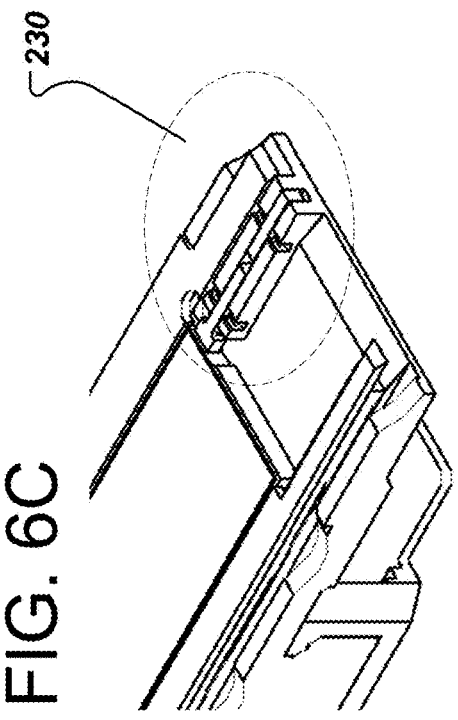
FIGS. 6A, 6B, 6C, and 6D depict example views of a footer assembly with weighted stops in a disengaged and engaged position.
Figure 6B:
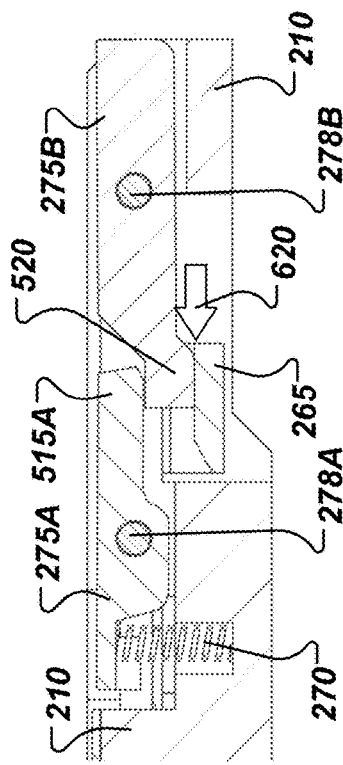

FIGS. 6A and 6B illustrate the configuration of the footer assembly 230 when the TIM 250 engaged. In this configuration, a lock footer 265 is in a first position at which the lock footer 265 does not contact a bottom surface of the lock engagement surface 520 or may not have sufficient contact with the lock engagement surface 520 such that the lock engagement surface 520 cannot push the extension portion 515A upward. Without sufficient structural support underneath the lock engagement surface 520, the weight of weighted bodies 510A and 510B causes weighted stops 275A and 275B to be tilted downward, as shown in FIG. 6B. With both weighted stops 275A and 275B tilted due to gravity, movement of the optical transceiver device 100 is prevented and the optical transceiver device 100 may remain engaged with the heat-transferring device 280.

FIG. 6B depicts a side view of the footer assembly 230 and shows the base 265 and spring 275 coupled to weighted stop 275A. Spring 275 provides structural support to the weighted stop 275A and resistance against force applied by the lock engagement surface 520 onto the weighted stop 275A. FIG. 6B also shows a lock footer 265 placed beneath the weighted stop 275B. The lock footer 265 may be coupled to the slide 220 such that a movement of the slide 220 causes the lock footer 265 to laterally move between two positions. For instance, when slide 220 is in the first position, projection 350 may be located within the projection receptacle and lock footer 265 may be in a first position at which it does not have any contact or lacks sufficient contact to cause lock engagement surface 520 to be horizontally level.

When slide 220 is in the second position, projection 350 may not be located within the projection receptacle and lock footer 265 may be in a second position at which an upper surface of the lock footer 265 directly contacts a bottom surface of the lock engagement surface 520 causing it to be horizontally level. This configuration is depicted in FIG. 6D. Arrow 620 shows an example lateral movement of the lock footer 265 from the first position in FIG. 6B to the second position in FIG. 6D.

Figure 6C:
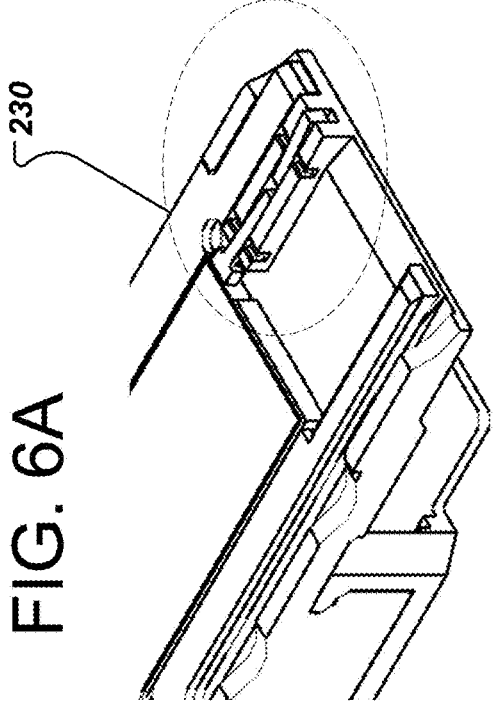
Figure 6D:
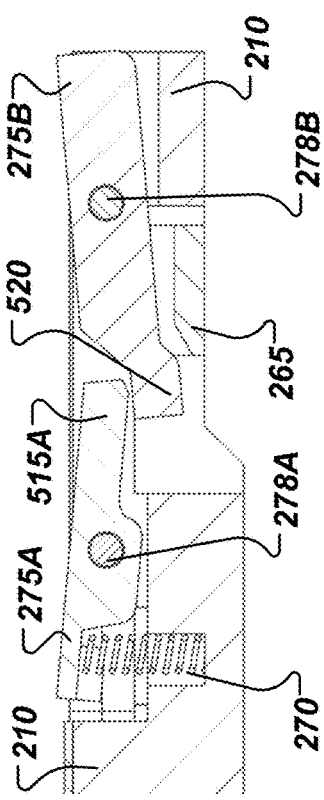

As shown in FIGS. 6C and 6D, in this configuration, the lock engagement surface 520 may push up against the extension portion 515A. Consequently, top surfaces of the weighted stops 275A and 275B are level or approximately level with each other and parallel to an upper surface of the lock engagement surface 520. In the second position, the lock footer 265 may prevent the weighted stops 275A and 275B from tilting, thereby allowing the optical transceiver device 100 to be disengaged from the heat-transferring device 280 and cage 290.

In the implementations described above, slide 220 may be laterally moved across slide rails 310A and 310B to engage or disengage the optical transceiver device 100 with a heat-transferring device 280. In addition, the optical transceiver device 100 may include a locking assembly that can prevent the optical transceiver device 100 from accidentally or unintentionally disengaging with the heat-transferring device 280. In the above-described implementations, handle 225 could be used to move slide 220. In some implementations, handle 225 may be replaced with a cam lever.

FIGS. 7A-8C depict examples of an optical transceiver device having a cam lever 725. The cam lever 725 may be attached to the slide 820 and may include block 860. Slide 820 is similar to slide 220 and may include two or more guide slots 840 (one of which is shown in FIGS. 8A-8C). The guide slots 840 may prevent angle loading of the slide 820 and are configured to receive pins 830 attached to the slide 820. Because the pins 830 are restricted to movement within the guide slots 840, the guide slots 840 may restrict the slide 820 to backward and forward lateral movements within the guide slots 840.

Figure 7A:
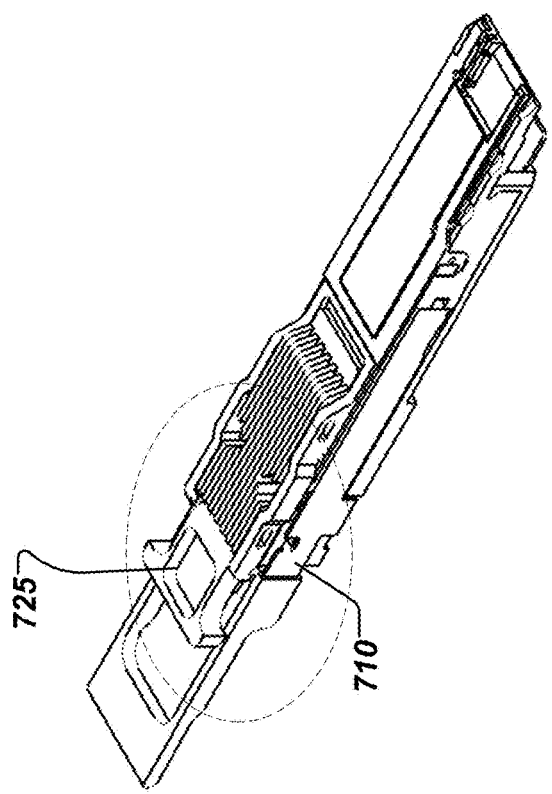
FIGS. 7A and 7B depict views of an example lever used to manipulate a slide of the optical transceiver device.

The cam lever 725 may be rotated at different positions. For example, as shown in FIGS. 7A and 8A, the cam lever 725 may be in a first position in which the cam lever 725 extends parallel to the surface of shell 710. In this position, a protrusion barrier 850 of the shell 710 can block lateral movement of the cam lever 725 and slide 820. In particular, block 860, which is attached to one side of the cam lever 725, cannot move laterally due to the presence of protrusion barrier 850, which blocks the slide 820 from sliding. In this position, the TIM 250 may be in direct contact with the heat-transferring device 280.

Figure 7B:
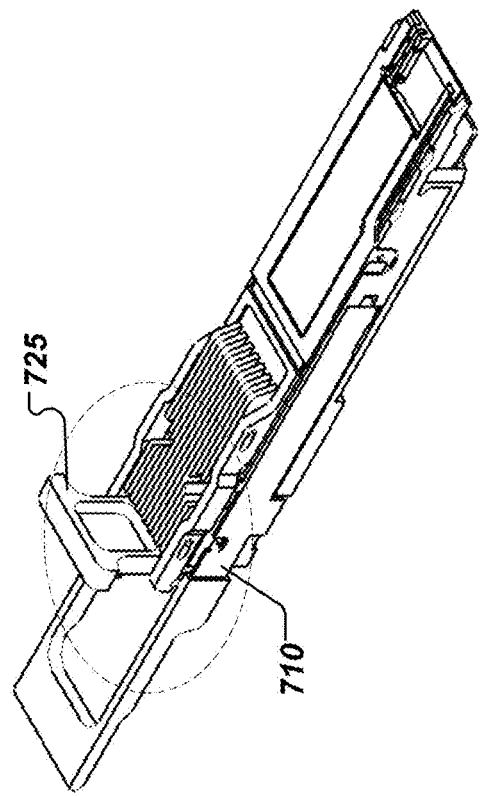

FIGS. 7B and 8B shows an example of when the cam lever 725 has been rotated substantially 90° into a second position such that the cam lever 725 is now oriented perpendicular to its first position and to the surface of shell 710. Moving the cam lever 725 to its second position may cause the slide 820 to move laterally as indicated in FIG. 8B by movement of the pin 830. The slide 820's lateral movement may, in turn, cause the lift 240 to be elevated in the manner described above. And as explained above, when the lift 240 is elevated, a top surface of the lift 240 is higher than a top surface of TIM 250 relative to the surface of the shell 710/210. Lift 240 may then contact the heat-transferring device 280 and cause the TIM 250 to be disengaged from the heat-transferring device 280. In the second position, the optical transceiver device may be extracted (or inserted) into a connecting module such as the heat-transferring device 280.

In FIG. 8C, the cam lever 725 can be rotated back into the first position at which it is level with the surface of shell 710. In this position, the TIM 250 may engage with the heat-transferring device 280 again. In the implementations shown in FIGS. 7A-8C, a different mechanism is used to move the slide in the optical transceiver device 100 to engage or disengage with the heat-transferring device 280.

While this specification contains many specifics, these should not be construed as limitations on the scope of the disclosure or of what may be claimed, but rather as descriptions of features specific to particular implementations. Certain features that are described in this specification in the context of separate implementations may also be combined. Conversely, various features that are described in the context of a single implementation may also be implemented in multiple implementations separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation. Similarly, the separation of various system components in the implementations described above should not be understood as requiring such separation in all implementations.

Terms used herein and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second,"

"third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

What is claimed is:

1. A device comprising:
a shell configured to provide a cover for the device and comprising a projection receptacle;
a slide configured to slide along a surface of the shell and comprising a projection that is configured (i) to be located in the projection receptacle in a first mode in which a thermal interfacing structure is contacting a heat-transferring device, and (ii) to be located outside the projection receptacle in a second mode in which the thermal interfacing structure is not contacting the heat-transferring device; and
a lift disposed on the slide and configured to be separated by a distance from the heat-transferring device in the first mode and to be elevated to contact the heat-transferring device in the second mode.

2. The device of claim 1, further comprising:
a cam lever having a first position corresponding to the first mode and a second position corresponding to the second mode,
wherein a first portion of the slide is attached to the cam lever and a second portion of the slide is configured to adjust an elevation level of the lift.

3. The device of claim 2, wherein:
the first position of the cam lever is substantially perpendicular to the second position of the cam lever; and
in the second mode, a top surface of the lift is higher than a top surface of the thermal interfacing structure relative to the surface of the shell.

4. The device of claim 1, wherein:
the slide is about 2 mm closer to the heat-transferring device in the first mode than in the second mode; and
a top surface of the lift elevates by about 100 to 150 microns.

5. The device of claim 1, wherein:
the heat-transferring device comprises a heat sink;
the projection comprises a lobe; and
the projection receptacle comprises a lobe receptacle.

6. The device of claim 2, further comprising:
a protrusion barrier configured to block the slide from sliding and permit the thermal interfacing structure to contact the heat-transferring device when the cam lever is in the first position, and to permit the slide to move and disengage the thermal interfacing structure from the heat-transferring device when the cam lever is in the second position.

7. The device of claim 1, wherein the slide comprises at least two guide slots configured to:
receive pins to facilitate lateral movement of the slide; and
prevent angle loading of the slide.

8. The device of claim 2, wherein:
the shell comprises a weighted stop configured to be in a locked position when a lock footer is in a first position in the first mode, and configured to be in an unlocked position when the lock footer is in second position in the second mode; and
the weighted stop is in a tilted orientation in the locked position.

9. The device of claim 8, wherein:
in the first mode, a top surface of the lock footer does not contact the weighted stop; and
in the second mode, the top surface of the lock footer directly contacts a bottom surface of the weighted stop.

10. The device of claim 8, wherein:
the lock footer is configured to be shifted laterally to transition between the first mode and the second mode; and
the weighted stop is configured to be shifted vertically to transition between the first mode and the second mode.

11. The device of claim 8, wherein the weighted stop comprises:
a weight portion that comprises a majority of the mass of the weighted stop;
a pin portion configured to anchor the weighted stop; and
a lock engagement surface at a bottom end of the weighted stop and configured to directly contact the lock footer in the first mode.

12. A pluggable optical transceiver device comprising:
a slide configured to move between a first position in which a heat-transferring device is engaged with a thermal interfacing structure and a second position in which the heat-transferring device is not engaged with the thermal interfacing structure;
the thermal interfacing structure disposed between a heat-transferring device and the slide;
a lift disposed on the slide and configured to be separated from the heat-transferring device by the thermal interfacing structure when the slide is in the first position and configured to directly contact the heat-transferring device when the slide is in the second position.

13. The pluggable optical transceiver device of claim 12, further comprising:
a shell comprising a weighted stop configured to be (i) in a locked position when the heat-transferring device is not engaged with the thermal interfacing structure, and (ii) in an unlocked position when the heat-transferring device is engaged with the thermal interfacing structure,
wherein the weighted stop is in a tilted orientation in the locked position and is configured to prevent disengagement of the heat-transferring device from the thermal interfacing structure.

14. The pluggable optical transceiver device of claim 13, further comprising:
a lock footer is configured to shift laterally between a first position that supports the locked position of the weighted stop and a second position that supports the unlocked position of the weighted stop,
wherein:
in the second position of the lock footer, an upper surface of the lock footer is configured to directly contact a lock engagement surface at a bottom end of the weighted stop to prevent the weighted stop from being tilted; and
in the first position of the lock footer, the upper surface of the lock footer is configured not to contact the lock engagement surface to permit the weighted stop to be tilted.

15. The pluggable optical transceiver device of claim 12, further comprising a shell comprising a projection receptacle, wherein the slide is configured to slide along a surface of the shell and comprises a projection that is configured (i) to be located in the projection receptacle when the heat-transferring device is engaged with the thermal interfacing structure, and (ii) to be located outside the projection receptacle when the heat-transferring device is not engaged with the thermal interfacing structure.

16. The pluggable optical transceiver device of claim 15, wherein:

the heat-transferring device comprises a heat sink;

the projection comprises a lobe; and the projection receptacle comprises a lobe receptacle.

17. The pluggable optical transceiver device of claim 12, wherein:

the slide is about 2 mm closer to the heat-transferring device when the heat-transferring device is engaged with the thermal interfacing structure than when the heat-transferring device is not engaged with the thermal interfacing structure; and a top surface of the lift is about 100 to 150 microns higher when the heat-transferring device is not engaged with the thermal interfacing structure than when the heat-transferring device is engaged with the thermal interfacing structure.

18. The pluggable optical transceiver device of claim 12, further comprising:

a cam lever attached to one end of the slide and being configured to move the slide between the first position and the second position of the slide.

19. The pluggable optical transceiver device of claim 18, wherein the cam lever is rotated by about ninety degrees to move the slide between the first position and the second position of the slide.

20. A quad small form factor pluggable double density device comprising:

a shell configured to cover the quad small form factor pluggable double density device and comprising a projection receptacle;

a slide comprising a projection and being configured to move along a surface of the shell between a first position where the projection is configured to be located in the projection receptacle such that a thermal interfacing structure directly contacts a heat-transferring device and a second position where the projection is not located in the projection receptacle such that the thermal interfacing structure is not contacting the heat-transferring device;

the thermal interfacing structure disposed between a heat-transferring device and the slide;

a lift disposed on the slide and configured to be (i) separated from the heat-transferring device by the thermal interfacing structure when the thermal interfacing structure is directly contacting the heat-transferring device, and (ii) directly contacting the heat-transferring device when the thermal interfacing structure is not directly contacting the heat-transferring device; and a cam lever attached to one end of the slide and being configured to move the slide between the first position and the second position of the slide such that a height of the lift increases by about 100 to 150 microns relative to the surface of the slide.

21. The device of claim 1, further comprising a transceiver, which is covered by the shell.

* * * * *